(12) United States Patent
Bökelund et al.

(10) Patent No.: US 10,781,738 B2
(45) Date of Patent: Sep. 22, 2020

(54) METHOD AND A SYSTEM FOR DETERMINING A PERFORMANCE OF A PARTICULATE FILTER OF AN ENGINE

(71) Applicant: Scania CV AB, Södertälje (SE)

(72) Inventors: Björn Bökelund, Södertälje (SE); Lars-Göran Nylén, Nykvarn (SE)

(73) Assignee: Scania CV AB, Södertälje (SE)

( * ) Notice: Subject to any disclaimer, the term of this patent is extended or adjusted under 35 U.S.C. 154(b) by 201 days.

(21) Appl. No.: 15/776,751

(22) PCT Filed: Dec. 19, 2016

(86) PCT No.: PCT/SE2016/051284
§ 371 (c)(1),
(2) Date: May 16, 2018

(87) PCT Pub. No.: WO2017/119836
PCT Pub. Date: Jul. 13, 2017

(65) Prior Publication Data
US 2019/0024565 A1    Jan. 24, 2019

(30) Foreign Application Priority Data
Jan. 5, 2016   (SE) ...................... 1650006

(51) Int. Cl.
*F01N 11/00* (2006.01)
*F01N 3/021* (2006.01)
*F01N 3/033* (2006.01)

(52) U.S. Cl.
CPC ............ *F01N 11/002* (2013.01); *F01N 3/021* (2013.01); *F01N 3/033* (2013.01); *F01N 11/00* (2013.01);
(Continued)

(58) Field of Classification Search
CPC .......... F01N 11/002; F01N 11/00; F01N 3/00; F01N 3/021; F01N 3/033; F01N 7/00;
(Continued)

(56) References Cited

U.S. PATENT DOCUMENTS

| 2005/0268597 A1 | 12/2005 | Kosaka |
| 2008/0041035 A1 | 2/2008 | Sawada et al. |

(Continued)

OTHER PUBLICATIONS

Mingqiang Y, Kidiyo K, Joseph R.; "A Survey of Shape Feature Extraction Techniques". In: Pattern Recognition Technology and Applications, Yin Peng-Yeng, ISBN 978-953-7619-24-4, 626 pages,Publisher: InTech, Chapters published Nov. 1, 2008; See p. 52, paragraph 2.12.

(Continued)

*Primary Examiner* — Harshad R Patel
*Assistant Examiner* — Nigel H Plumb
(74) *Attorney, Agent, or Firm* — Moore & Van Allen PLLC; W. Kevin Ransom (57) ABSTRACT

Provided is a method for determining a performance of a particulate filter of an engine. The method determines an exhaust gas temperature upstream of the particulate filter, an exhaust gas temperature downstream of the particulate filter, and an exhaust gas mass flow upstream of said particulate filter The method further determines a modelled temperature based on the exhaust gas temperature and the exhaust gas mass flow upstream of the particulate filter. A residual value is determined on the basis of the exhaust gas temperature downstream of the particulate filter and the modelled temperature. An equivalent hole size of the particulate filter is then determined using a predetermined function that defines a relationship between the residual value and an equivalent hole size, where equivalent hole size indicates said performance of said particulate filter.

11 Claims, 4 Drawing Sheets

(52) U.S. Cl.
CPC .. *F01N 2550/04* (2013.01); *F01N 2900/1404* (2013.01); *F01N 2900/1411* (2013.01); *Y02T 10/20* (2013.01); *Y02T 10/47* (2013.01)

(58) Field of Classification Search
CPC .................. F01N 9/00; F01N 2550/04; F01N 2900/1404; F01N 2900/1411; Y02T 10/20; Y02T 10/47; G01M 15/10
See application file for complete search history.

(56) References Cited

U.S. PATENT DOCUMENTS

| | | |
|---|---|---|
| 2009/0205318 A1 | 8/2009 | Shibata et al. |
| 2009/0229252 A1 | 9/2009 | Thouvenel et al. |
| 2011/0000193 A1 | 1/2011 | Paterson et al. |
| 2012/0023911 A1 | 2/2012 | Liu et al. |

OTHER PUBLICATIONS

International Search Report of PCT/SE2016/051284 dated Mar. 7, 2017.
Written Opinion of the International Searching Authority for PCT/SE2016/051284 dated Mar. 7, 2017.
SCANIA CV AB, International Application No. PCT/SE2016/051284, International Preliminary Report on Patentability, dated Jul. 10, 2018.
SCANIA CV AB, Korean Application No. 10-2018-7020909, Office Action, dated Aug. 20, 2019.

METHOD AND A SYSTEM FOR DETERMINING A PERFORMANCE OF A PARTICULATE FILTER OF AN ENGINE

CROSS-REFERENCE TO RELATED APPLICATION(S)

This application is a National Stage Application (filed under 35 § U.S.C. 371) of PCT/SE2016/051284, filed Dec. 19, 2016 of the same title, which, in turn claims priority to Swedish Application No. 1650006-8 filed Jan. 5, 2016 of the same title; the contents of each of which are hereby incorporated by reference.

FIELD OF THE INVENTION

The present invention relates to a method, system, and computer program product for determining a performance of a particulate filter of an engine. It relates also to a motor vehicle being equipped with the system.

BACKGROUND OF THE INVENTION

According to various regulations it is necessary to determine accumulated soot emissions generated by e.g. combustion engines of motor vehicles. Some of these regulations stipulate that maximum accumulated soot emissions are allowed during determined engine operational cycles. Emission control systems of vehicles may be equipped with a particulate filter being arranged to filter engine emissions such as soot. It is desired to be able to determining performance of such filters.

Today it is possible to continuously detect a soot mass flow by means of a soot mass flow sensor and thus also an accumulated soot emission value corresponding to a determined engine operational cycle. This sensor is however relatively expensive and does not provide desired accuracy.

It is also possible to determine an accumulated soot emission value based on a determined differential pressure over a particulate filter of an emission control system of a vehicle. This may be performed by means of a suitable model of a control unit of said vehicle. It is however difficult to achieve robust calculation models, in particular during operational conditions where a relatively low differential pressure over said particulate filter is detected.

US20110000193 depicts a method for detecting a crack of a diesel particulate filter based on a calculated temperature of emission gas from an engine and a prevailing temperature of said emission gas.

SUMMARY OF THE INVENTION

An object of the present invention is to propose a novel and advantageous method for determining a performance of a particulate filter of an engine.

Another object of the invention is to propose a novel and advantageous system and a novel and advantageous computer program for determining a performance of a particulate filter of an engine.

An object of the present invention is to propose a novel and advantageous method for accurately determining a performance of a particulate filter of an engine in a cost efficient way.

Another object of the invention is to propose a novel and advantageous system and a novel and advantageous computer program for accurately determining a performance of a particulate filter of an engine in a cost efficient way.

Yet another object of the invention is to propose a method, a system and a computer program achieving a reliable, robust, automated and time efficient determination of performance of an emission filter arrangement.

Yet another object of the invention is to propose a method, a system and a computer program for determining a performance of a diesel particulate filter of an selective catalytic reduction (SCR)-system for a combustion engine. Yet another object of the invention is to propose a method, a system and a computer program for determining a performance of a diesel particulate filter of an SCR-system for a combustion engine of a vehicle.

Yet another object of the invention is to propose an alternative method, an alternative system and an alternative computer program for determining a performance of a particulate filter of an engine According to an aspect of the invention there is provided a method for determining a performance of a particulate filter of an engine. The method comprises the steps of:

determining at least one exhaust gas temperature upstream of said particulate filter;

determining an exhaust gas temperature downstream of said particulate filter;

determining an exhaust gas mass flow upstream of said particulate filter;

determining a modelled temperature on the basis of said at least one exhaust gas temperature upstream of said particulate filter and said exhaust gas mass flow upstream of said particulate filter;

determining a residual value on the basis of said exhaust gas temperature downstream of said particulate filter and said modelled temperature; and determining an equivalent hole size of said particulate filter from a predetermined function regarding a relation between said residual value and equivalent hole size as a basis for considering said performance of said particulate filter.

Advantageously a reliable and accurate determination regarding said performance of said particulate filter is hereby achieved. It is hereby possible to determine an equivalent hole size of said particulate filter in a user-friendly, automated and cost effective manner.

The determined exhaust gas temperature downstream of said particulate filter may be a measured temperature.

The modelled temperature may be the temperature that should prevail downstream of the particulate filter based on said at least one exhaust gas temperature upstream of said particulate filter and said exhaust gas mass flow upstream of said particulate filter. The modelled temperature may be the temperature that should prevail downstream of the particulate filter, based on said at least one exhaust gas temperature upstream of said particulate filter and said exhaust gas mass flow upstream of said particulate filter, during normal performance of the particulate filter.

By paying regard to a temperature inertia of said particulate filter performance of said particulate filter may hereby advantageously be determined.

The inventors have discovered the surprisingly correlation between said residual value and an equivalent hole size of said particulate filter. Hereby an actual crack size or an actual hole size of the particulate filter filtering surface may be accurately estimated. If said determined equivalent hole size is greater than a predetermined threshold value it may be determined that said particulate filter should be repaired or replaced.

Advantageously the inventive method may be used as an alternative to other methods of evaluating performance of a particulate filter of a combustion engine. Advantageously the inventive method may be used for controlling results of other methods of evaluating performance of a particulate filter of a combustion engine, such as methods relying on a determined differential pressure over said particulate filter.

The method may comprise the steps of:

further determining a temperature difference over said particulate filter regarding said exhaust gas temperature; and determining said residual value on the basis of said exhaust gas temperature downstream of said particulate filter and said modelled temperature as well as said temperature difference.

Hereby a reliable and accurate determination regarding said performance of said particulate filter is hereby achieved. By using a model or physical sensors for determining said temperature difference over said particulate filter regarding said exhaust gas temperature a relatively cost effective method according to an embodiment is provided. Hereby said residual value may be determined in an accurate and cost effective manner.

The method may comprise the step of:

determining a suspected defect of said particulate filter on the basis of said equivalent hole size. Hereby an impaired particulate filter may be diagnosed. It is hereby possible to determine to what degree said particulate filter is damaged/impaired/broken.

The method may comprise the step of:

determining an expected accumulated soot emission from said exhaust gas down stream of said particulate filter on the basis of said equivalent hole size of said particulate filter from a predetermined function regarding a relation between said accumulated soot emission and said equivalent hole size. Said accumulated soot emission from said exhaust gas flow may relate to a predetermined operation cycle of said engine. Hereby it may be determined if said particulate filter fulfils environmental requirements according to relevant regulations. It may hereby be determined a filtering capacity of said particulate filter.

Advantageously it is possible to determine performance of said particulate filter both regarding hole size of said filtering surface of said particulate filter as well as an accumulated amount of soot emission fed to an environment caused by said hole size of said filtering surface.

According to an aspect of the invention there is provided a system for determining a performance of a particulate filter of an engine, comprising:

means for determining at least one exhaust gas temperature upstream of said particulate filter;

means for determining an exhaust gas temperature downstream of said particulate filter;

means for determining an exhaust gas mass flow upstream of said particulate filter;

means for determining a modelled temperature on the basis of said at least one exhaust gas temperature upstream of said particulate filter and said exhaust gas mass flow upstream of said particulate filter;

means for determining a residual value on the basis of said exhaust gas temperature downstream of said particulate filter and said modelled temperature; and means for determining an equivalent hole size of said particulate filter from a predetermined function regarding a relation between said residual value and equivalent hole size as a basis for considering said performance of said particulate filter.

The system may comprise:

means for determining a temperature difference over said particulate filter regarding said exhaust gas temperature; and means for determining said residual value on the basis of said exhaust gas temperature downstream of said particulate filter and said modelled temperature as well as said temperature difference.

The system may comprise:

means for determining a suspected defect of said particulate filter on the basis of said equivalent hole size.

The system may comprise:

means for determining an expected accumulated soot emission from said exhaust gas downstream of said particulate filter on the basis of said equivalent hole size of said particulate filter from a predetermined function regarding a relation between said accumulated soot emission and said equivalent hole size.

According to an aspect of the invention there is provided a vehicle comprising a system according to what is presented herein. Said vehicle may be a motor vehicle. Said vehicle may be any from among a truck, bus or passenger car. According to an embodiment the system is provided for a marine application or industrial application.

According to an aspect of the invention there is provided a computer program for determining a performance of a particulate filter of an engine, wherein said computer program comprises program code for causing an electronic control unit or a computer connected to the electronic control unit to perform the steps of the disclosed method.

According to an aspect of the invention there is provided a computer program for determining a performance of a particulate filter of an engine, wherein said computer program comprises program code stored on a computer-readable medium for causing an electronic control unit or a computer connected to the electronic control unit to perform the steps of the disclosed method.

According to an aspect of the invention there is provided a computer program for determining a performance of a particulate filter of an engine, wherein said computer program comprises program code stored on a computer-readable medium for causing an electronic control unit or a computer connected to the electronic control unit to perform the steps of the disclosed method, when run on said electronic control unit or said computer.

According to an aspect of the invention there is provided a computer program product containing a program code stored on a computer-readable medium for performing method steps of the disclosed method, when said computer program is run on an electronic control unit or a computer connected to the electronic control unit.

According to an aspect of the invention there is provided a computer program product containing a program code stored non-volatile on a computer-readable medium for performing method steps of the disclosed method, when said computer program is run on an electronic control unit or a computer connected to the electronic control unit.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognise further applications, modifications and incorporations in other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations denote similar items in the various diagrams, and in which.

DETAILED DESCRIPTION OF THE INVENTION

Figure 1:
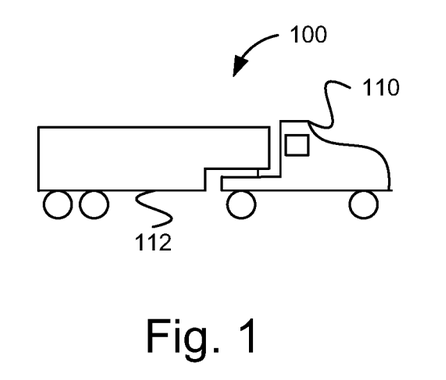
FIG. 1 schematically illustrates a vehicle according to an embodiment of the invention.

FIG. 1 depicts a side view of a vehicle 100. The exemplified vehicle 100 comprises a tractor unit 110 and a trailer 112. The vehicle 100 may be a heavy vehicle, e.g. a truck or a bus. It may alternatively be a car.

It should be noted that the inventive system for determining a performance of a particulate filter of an engine is applicable to various vehicles, such as e.g. a mining machine, tractor, dumper, wheel loader, platform comprising an industrial robot, forest machine, earth mover, road construction vehicle, road planner, emergency vehicle or a tracked vehicle. The vehicle may according to an example be an autonomous vehicle.

It should be noted that the invention is suitable for application in various systems comprising a combustion engine and a thereto associated filter arrangement, such as a particulate filter. It should be noted that the invention is suitable for application with any combustion engine and is therefore not confined to combustion engines of motor vehicles. The innovative method and the innovative system in one aspect of the invention are well suited to other platforms which comprise a fuel powered engine system than motor vehicles, e.g. watercraft. The watercraft may be of any kind, e.g. motor boats, steamers, ferries or ships.

According to an embodiment the innovative method and the innovative system may be applied to a filter arrangement as such. Hereby said filter does not necessarily relate to a filter for filtering emission gas from a combustion engine. Such a filter may e.g. be an air filter of an engine.

The innovative method and the innovative system according to one aspect of the invention are also well suited to, for example, systems which comprise industrial engines and/or engine-powered industrial robots and an associated filter arrangement.

The innovative method and the innovative system according to one aspect of the invention are also well suited to various kinds of power plants, e.g. an electric power plant which comprises an engine-powered generator and a filter arrangement.

The innovative method and the innovative system are also well suited to various engine systems, e.g. on a locomotive or some other platform.

The innovative method and the innovative system are also well suited to any system which comprises a soot or particles generator and a filter arrangement.

The term "link" refers herein to a communication link which may be a physical connection such as an optoelectronic communication line, or a non-physical connection such as a wireless connection, e.g. a radio link or microwave link.

The term "passage" refers herein to a pipe for holding and conveying emissions from an engine. The passage may be a pipe of any desired size and be made of any suitable material, e.g. any suitable alloy or metal.

The term "particulate filter" refers herein to any suitable filter arrangement being provided for emission control of an engine system. Said particulate filter may comprise a DPF-unit (diesel particulate filter) of a motor vehicle.

Figure 2:
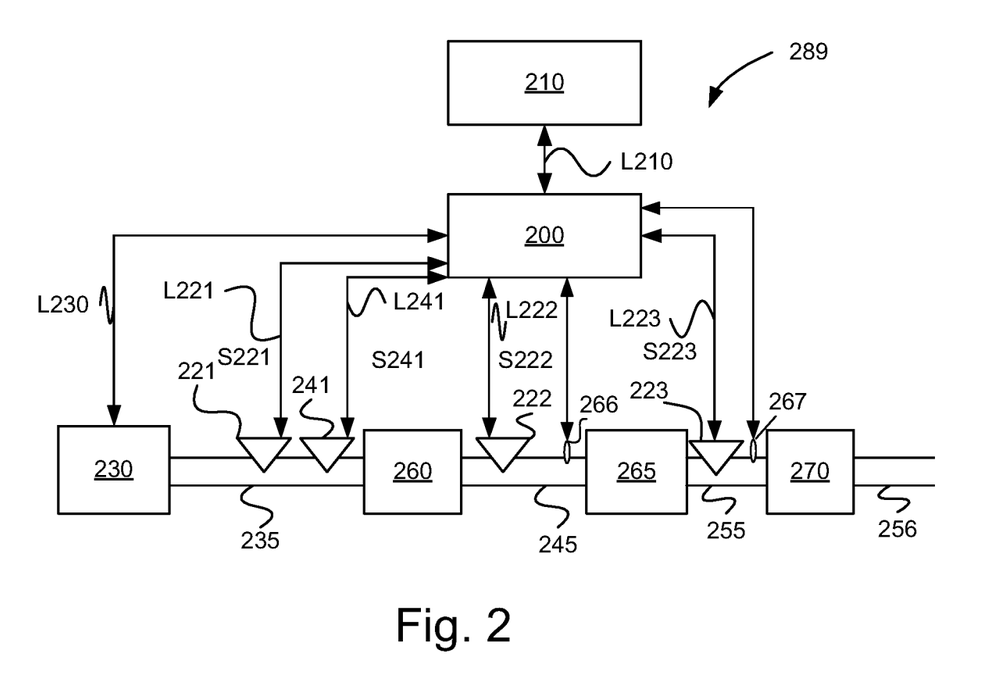
FIG. 2 schematically illustrates a subsystem of the vehicle depicted in FIG. 1, according to an embodiment of the invention.

FIG. 2 schematically illustrates a subsystem 289 of the vehicle 100 shown in FIG. 1, according to an aspect of the invention.

An engine 230 is during operation generating an exhaust gas flow which is lead via a first passage 235 to a diesel oxidation catalyst (DOC)-arrangement 260. Said engine 230 is a combustion engine. A second passage 245 is arranged to lead said exhaust gas from said DOC-arrangement 260 to a filter arrangement 265. Said filter arrangement 265 comprises a particulate filter. Said filter arrangement 265 may comprise a diesel particulate filter. A third passage 255 is arranged to lead said exhaust gas from said filter arrangement 265 to an SCR-unit 270. A fourth passage 256 is arranged to lead said exhaust gas from said SCR-unit 270 to an environment of said vehicle 100.

A first control unit 200 is arranged for communication with said combustion engine 230 via a link L230. The first control unit 200 is arranged to control operation of the engine 230 according to stored operational routines.

An exhaust gas mass flow sensor 241 is arranged for communication with said first control unit 200 via a link L241. Said exhaust gas mass flow sensor 241 is arranged for measuring a prevailing exhaust gas mass flow m. Said exhaust gas mass flow sensor 241 may be arranged in said first passage 235. Said exhaust gas mass flow sensor 241 is arranged to continuously or intermittently determine said prevailing exhaust gas mass flow $\dot{m}$ in the first passage 235 and continuously or intermittently send signals S241 comprising information thereof to the first control unit 200 via said link L241. According to an embodiment air intake mass flow of the engine may be determined (e.g. measured), whereby said exhaust gas mass flow may be estimated on the basis of said air intake mass flow. According to one example said exhaust gas mass flow $\dot{m}$ may be set to a value of said determined air intake mass flow.

According to an embodiment said first control unit 200 is arranged to continuously or intermittently determine a prevailing exhaust gas mass flow $\dot{m}$ by means of a model stored in a memory thereof. Hereby said first control unit 200 is arranged to determine/calculate/model/estimate a prevailing exhaust gas mass flow $\dot{m}$ from said engine 230. This may be performed on the basis of e.g. current operational parameters of said engine 230, such as engine load, engine speed, etc.

A first temperature sensor 221 is arranged upstream of said DOC-arrangement 260 at said first passage 235. Said first temperature sensor 221 is arranged for communication with the first control unit 200 via a link L221. The first temperature sensor 221 is arranged to continuously or intermittently determine a prevailing temperature T1meas of the exhaust gas in the first passage 235. The temperature sensor 221 is arranged to continuously or intermittently send signals S221 comprising information about said prevailing temperature T1meas of the exhaust gas to the first control unit 200 via the link L221.

The first control unit 200 may according to an embodiment be arranged to by means of a stored model calculate a prevailing temperature T1mod of the exhaust gas in the first passage 235. The first control unit 200 may be arranged to on the basis of information about for example an into said engine 230 injected amount of fuel and said exhaust gas mass flow ṁ calculate said prevailing temperature T1mod of the exhaust gas in the first passage 235.

A second temperature sensor 222 is arranged downstream of said DOC-arrangement 260 at said second passage 245. Said second temperature sensor 222 is arranged for communication with the first control unit 200 via a link L222. The second temperature sensor 222 is arranged to continuously or intermittently determine a prevailing temperature T2meas of the exhaust gas in the second passage 245. The second temperature sensor 222 is arranged to continuously or intermittently send signals S222 comprising information about said prevailing temperature T2meas of the exhaust gas to the first control unit 200 via said link L222.

The first control unit 200 may according to an embodiment be arranged to by means of a stored model calculate a prevailing temperature T2mod of the exhaust gas in the second passage 245. The first control unit 200 may be arranged to on the basis of information about for example an into said engine 230 injected amount of fuel and said exhaust gas mass flow ṁ calculate said prevailing temperature T2mod of the exhaust gas in the second passage 245.

A third temperature sensor 223 is arranged downstream of said filter arrangement 265 at said third passage 255. Said third temperature sensor 223 is arranged for communication with the first control unit 200 via a link L223. The third temperature sensor 223 is arranged to continuously or intermittently determine a prevailing temperature T3meas of the exhaust gas in the third passage 255. The third temperature sensor 223 is arranged to continuously or intermittently send signals S223 comprising information about said prevailing temperature T3meas of the exhaust gas to the first control unit 200 via said link L223.

A first pressure sensor 266 is arranged to detect a prevailing pressure P1 in the second passage 245, i.e. upstream of said filter arrangement 265. The first pressure sensor is arranged for communication with the first control unit 200 via a suitable link (not shown). The first pressure sensor is arranged to continuously or intermittently send signals comprising information about said detected pressure P1 to the first control unit 200 via said link.

A second pressure sensor 267 is arranged to detect a prevailing pressure value P2 in the third passage 255, i.e. downstream of said filter arrangement 265. The second pressure sensor is arranged for communication with the first control unit 200 via a suitable link. The second pressure sensor is arranged to continuously or intermittently send signals comprising information about said detected pressure value P2 to the first control unit 200 via said link.

The first control unit 200 may is according to an embodiment arranged to continuously determine a differential pressure Pdiff over said filter arrangement 265 on the basis of signals received from the first pressure sensor and the second pressure sensor. According to an embodiment the differential pressure Pdiff over said filter arrangement 265 may be determined on the basis of said first pressure value P1 measured by means of the first pressure sensor and a prevailing atmospheric pressure value or a predetermined reference pressure value.

The first control unit 200 may is according to an embodiment arranged to continuously determine a differential pressure value Pdiff over said filter arrangement 265 on the basis of signals received from the first pressure sensor and the second pressure sensor. According to an embodiment the differential pressure value Pdiff over the filter arrangement 265 is equal to a difference between P1 and P2, i.e. Pdiff=P1−P2.

The first control unit 200 may be arranged to determine a hole size of said filter arrangement 265 on the basis of said determined differential pressure value Pdiff over the filter arrangement 265 according to a model stored in a memory thereof.

The first control unit 200 may be arranged to determine expected accumulated soot emission value from said exhaust gas down stream of said filter arrangement 265.

The first control unit 200 is arranged to compare said hole size of said filter arrangement 265 and said expected accumulated soot emission value with corresponding values determined according to the inventive method. Hereby a validity check may be performed. If said comparisons result in deviating respective values, error search processes may be applied for diagnostic purposes.

The first control unit 200 is arranged for determining a calculated/modelled/estimated temperature value T3mod representing a temperature value of the exhaust gas in said third passage 255 downstream of said filter arrangement 265. The first control unit 200 is arranged to continuously or intermittently determine said temperature value T3mod. The first control unit 200 is arranged to determine said temperature value T3mod according to a model stored in a memory thereof. The first control unit is arranged to determine said temperature value T3mod on the basis of a suitable temperature value and said exhaust gas mass flow value ṁ. Said suitable temperature value may be said prevailing temperature T1meas, which is measured at said first passage 235. Said suitable temperature value may be said prevailing temperature T1mod, which is calculated by means of said first control unit 200. Said suitable temperature value may be said prevailing temperature T1meas, which is measured at said second passage 245. Said suitable temperature value may be said prevailing temperature T2mod, which is calculated by means of said first control unit 200. Said suitable temperature value may be determined on the basis of at least one of said temperature values T1mod, T1meas, T2mod and T2meas. Said exhaust gas mass flow value ṁ may be calculated or measured according to what is depicted above.

The first control unit 200 is arranged to determine said temperature value T3mod on the basis of at least one of said temperature values T1mod, T1meas, T2mod, T2meas and said exhaust gas mass flow value m.

The first control unit 200 is arranged to determine a difference Δt1 of said temperature value T3mod and said temperature value T3meas.

Hereby Δt1=T3mod−T3meas

The first control unit 200 is arranged to determine a difference Δt2 of a temperature value of said exhaust gas upstream of said filter arrangement 265 and a temperature value measured downstream of said filter arrangement 265.

Hereby said difference Δt2 may be defined by any of the examples below:

Δt2=T1meas−T3meas;

Δt2=T1mod−T3meas;

Δt2=T2meas−T3meas;

Δt2=T2mod−T3meas;

Alternatively, said difference Δt2 may be defined by a difference between any suitably determined temperature value representing an exhaust gas temperature upstream of said filter arrangement 265 and said temperature value T3meas.

Said first control unit 200 is arranged to determine a residual value R on the basis of said exhaust gas temperature value T3meas downstream of said particulate filter 265 and said modelled temperature value T3mod.

According to one example said residual value R is defined as $$R = \text{abs}\left(\frac{\Delta t1}{\Delta t2}\right)$$

Thus, said residual value R is the absolute value of a ratio of said difference Δt1 and said difference Δt2.

According to one embodiment said residual value R is based on the difference Δt1 only.

According to one embodiment said residual value R is based on the difference Δt2 only.

According to an embodiment said residual value R is determined on the basis of the difference Δt1 and the difference Δt2.

It should be noted that the inventive method is based on the principle of measuring a temperature value down stream of said filter arrangement 265 and comparing this temperature value with a suitable reference temperature value.

Said first control unit 200 is arranged for determining an equivalent hole size HAR (hole area ratio) of said filter arrangement 265 from a predetermined function K regarding a relation between said residual value R and equivalent hole size HAR as a basis for considering said performance of said filter arrangement 265. Said predetermined function K may be a predetermined function K, which is stored in a memory of said first control unit 200. Said predetermined function K may have been empirically determined. Said function K is depicted in greater detail with reference to FIG. 3a.

Said first control unit 200 is arranged for determining an expected accumulated soot emission value ASE from said exhaust gas down stream of said particulate filter 265 on the basis of said equivalent hole size HAR of said particulate filter 265 from a predetermined function L regarding a relation between said accumulated soot emission value and said equivalent hole size HAR. Said predetermined function L may have been empirically determined. Said function L is depicted in greater detail with reference to FIG. 3b.

Herein it is depicted that said subsystem 289 comprises said DOC-arrangement 260 and said SCR-unit 270. It should be noted that these components according to one embodiment may be omitted. Hereby suitable adaptions to the inventive method are required, such as only determining T1meas and/or T1mod, which reduces the number of possible alternatives of the definition of said difference Δt2.

Figure 3A:
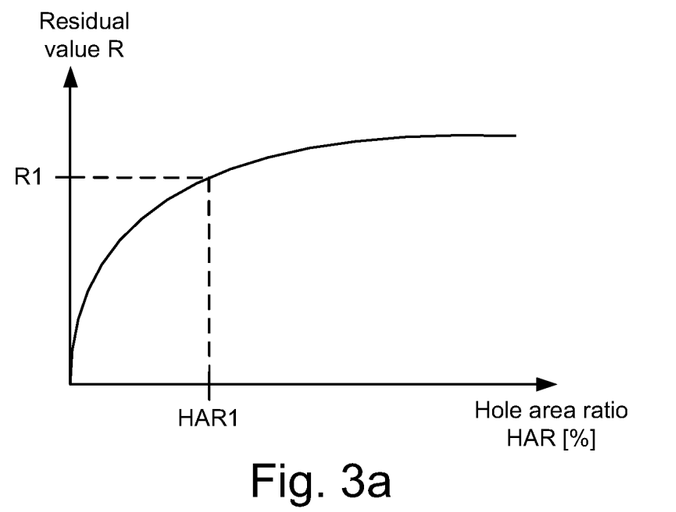
FIGS. 3a schematically illustrates a diagram relating to an embodiment of the invention.

FIG. 3a schematically presents a diagram according to an example embodiment. Herein a predetermined function K is presented. Hereby residual value R is given as a function of hole area ratio HAR. Said residual value is dimension less. Hereby said hole area ratio HAR is given in percentage %.

Herein, according to an example, R is defined as $$R = \text{abs}\left(\frac{\Delta t1}{\Delta t2}\right)$$

A certain hole area ratio value HAR is corresponding to a certain hole size in said filter arrangement 265. This means that if a hole area ratio value is 1% this corresponds to state of said filter arrangement 265 where 1% of a total filtering surface said filter arrangement 265 is open. This is equivalent of said filter arrangement 265 presenting a hole of said relative size 1%.

Herein is exemplified that a residual value R is determined to be R1. According to an example R1=2.0. A corresponding hole area ratio is HAR1. According to this example said hole area ratio HAR1=20%.

Hereby it may be determined an equivalent hole size, expressed as said value HAR1, of said particulate filter 265 from said predetermined function K regarding a relation between said residual value R and equivalent hole size as a basis for considering said performance of said particulate filter 265. The larger hole area ratio (equivalent hole size) HAR1 the more impaired performance of said particulate filter 265. Hereby a suspected defect of said particulate filter 265 may be determined on the basis of said equivalent hole size.

Figure 3B:
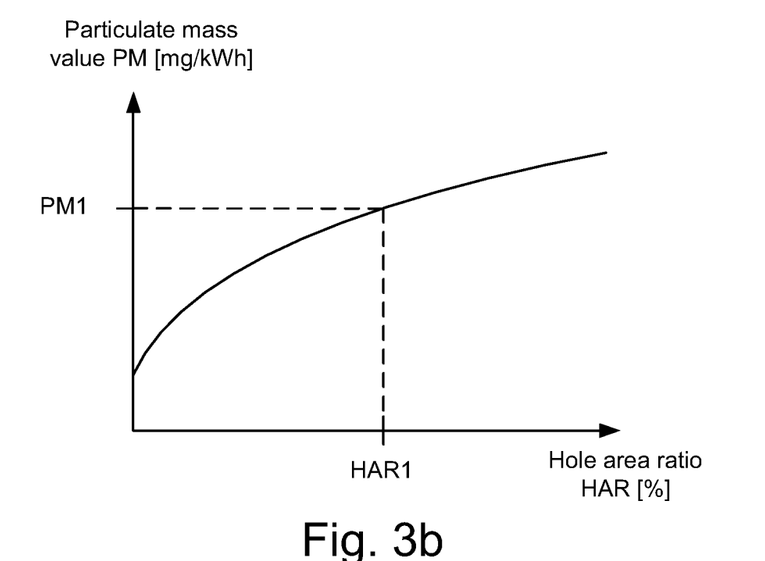
FIGS. 3b schematically illustrates a diagram relating to an embodiment of the invention.

FIG. 3b schematically presents a diagram according to an example embodiment. Herein a predetermined function L is presented. Hereby particulate mass value PM is given as a function of hole area ratio HAR. Said particulate mass value PM is given in mg/kWh. Hereby said hole area ratio HAR is given in percentage %.

By using the determined hole area ratio value HAR1 it is hereby possible to determine a corresponding particulate mass value PM, namely PM1, from said function L. It is hereby possible to determine an expected accumulated soot emission from said exhaust gas downstream of said particulate filter 265 on the basis of said equivalent hole size, expressed as HAR1, of said particulate filter 265 from said predetermined function L regarding a relation between said accumulated soot emission and said equivalent hole size.

Advantageously, according to an embodiment of the invention, it is hereby possible to determine a hole area ratio, reflecting prevailing performance of said particulate filter 265, as well as an expected accumulated soot emission from said exhaust gas downstream of said particulate filter 265 which is correlated to said determined hole area ratio.

According to an example it is possible to determine a filtering performance value, also denoted degree of filtering. This may be given in percent %. Where 100% indicates that all soot is filtered and 0% indicates that not any soot is filtered. According to this example said filtering performance may be presented by a predetermined function of said hole area ratio HAR. By determining accumulated exhaust gas mass flow and said filtering performance it is possible to determine expected accumulated soot emission from said exhaust gas downstream of said particulate filter 265.

It is herein relevant to present said particulate mass value PM and said filtering performance correlated to an operational cycle. Said operational cycle may be associated to regulations of emission control.

Figure 4A:
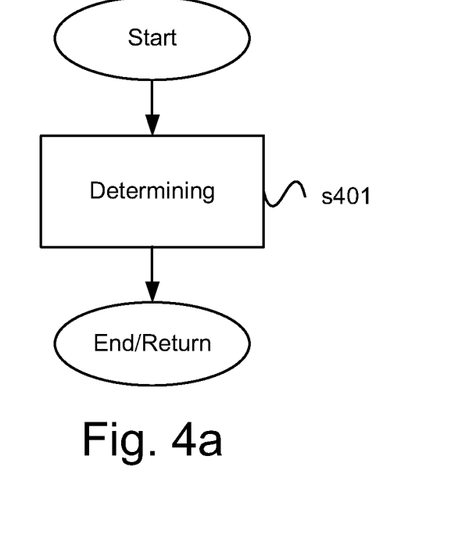
FIG. 4a is a schematic flowchart of a method according to an embodiment of the invention.

FIG. 4a schematically illustrates a flow chart of a method for determining a performance of a particulate filter 265 of an engine 230. The method comprises the method step s401. The method step s401 comprises the steps of:

determining at least one exhaust gas temperature upstream of said particulate filter 265;

determining an exhaust gas temperature T3meas downstream of said particulate filter 265;

determining an exhaust gas mass flow ṁ upstream of said particulate filter 265;

determining a modelled exhaust gas temperature T3mod on the basis of said at least one exhaust gas temperature T1meas, T1mod, T2meas, T2mod upstream of said particulate filter 265 and exhaust gas mass flow ṁ upstream of said particulate filter 265;

determining a residual value R on the basis of said exhaust gas temperature T3meas downstream of said particulate filter 265 and said modelled temperature T3mod; and determining an equivalent hole size HAR of said particulate filter 265 from a predetermined function K regarding a relation between said residual value R and equivalent hole size HAR as a basis for considering said performance of said particulate filter 265. After the method step s401 the method ends.

Figure 4B:
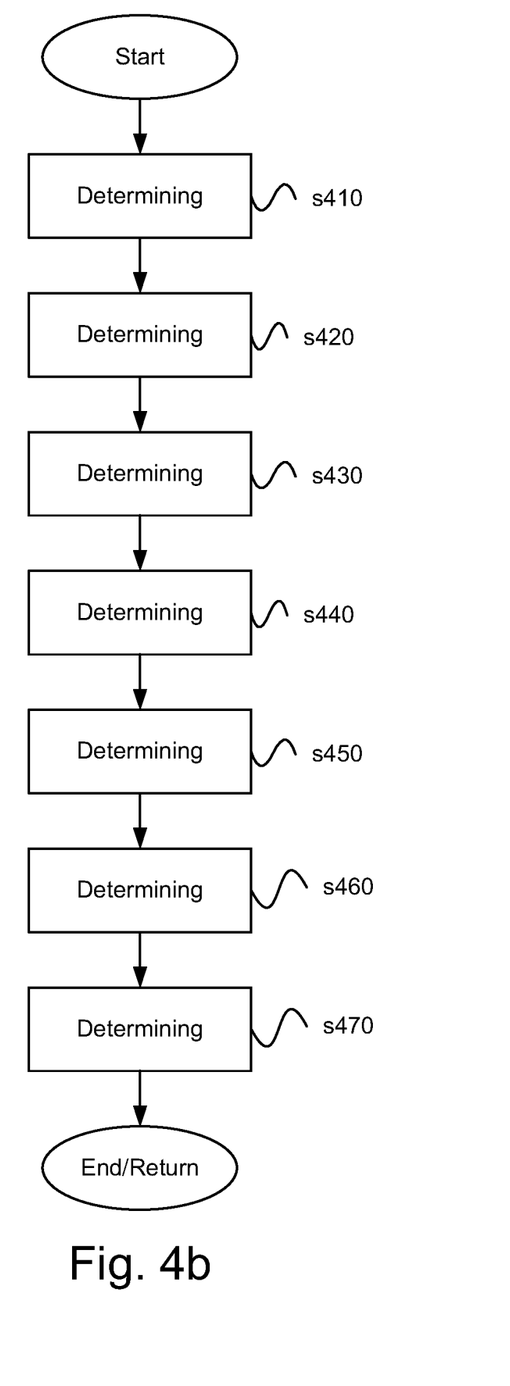
FIG. 4b is a more detailed schematic flowchart of a method according to an embodiment of the invention.

FIG. 4*b* schematically illustrates a flow chart of a method for determining a performance of a particulate filter 265 of an engine 230. The method comprises a first method step s410.

The method step s410 comprises the step of determining at least one exhaust gas temperature value upstream of said particulate filter 265. This may be performed by means of said first temperature sensor 221 and/or said second temperature sensor 222. Alternatively said at least one exhaust gas temperature value upstream of said particulate filter 265 may be determined/calculated/modelled/estimated by a model of said first control unit 200. Hereby at least one exhaust gas temperature value upstream of said particulate filter 265 may be anyone of said temperature values T1mod, T1meas, T2mod, T2meas. After the method step s410 a subsequent method step s420 is performed.

The method step s420 comprises the step of determining an exhaust gas temperature value T3meas downstream of said particulate filter 265. This is performed by means of said third temperature sensor 223. Said exhaust gas temperature value T3meas downstream of said particulate filter 265 is detected/measured and not calculated/modelled according to an embodiment of the invention. After the method step s420 a subsequent method step s430 is performed.

The method step s430 comprises the step of determining an exhaust gas mass flow value ṁ upstream of said particulate filter 265. This may be performed by means of said exhaust gas mass flow sensor 241. Alternatively said exhaust gas mass flow value ṁ may be determined/calculated/modelled/estimated by a model of said first control unit 200.

After the method step s430 a subsequent method step s440 is performed.

The method step s440 comprises the step of determining a modelled temperature value T3mod representing a temperature value of said exhaust gas downstream of said particulate filter, e.g. in said third passage 255, on the basis of said at least one exhaust gas temperature T1mod, T1meas, T2mod, T2meas upstream of said particulate filter 265 and said exhaust gas mass flow ṁ upstream of said particulate filter 265. Said first control unit 200 is hereby arranged to determine/calculate/model/estimate said temperature value by a suitable model stored in a memory thereof.

After the method step s440 a subsequent method step s450 is performed.

The method step s450 comprises the step of determining a residual value R on the basis of said exhaust gas temperature T3meas downstream of said particulate filter 265 and said modelled temperature T3mod. This may be performed by means of said first control unit 200.

According to an embodiment said residual value R is determined on the basis of said difference Δt1 and said difference Δt2. According to an embodiment said residual value R is determined on the basis of an absolute value of a ratio of said difference Δt1 and said difference Δt2.

After the method step s450 a subsequent method step s460 is performed.

The method step s460 comprises the step of determining an equivalent hole size HAR of said particulate filter 265 from a predetermined function K regarding a relation between said residual value and equivalent hole size HAR as a basis for considering said performance of said particulate filter 265. This is performed by means of said first control unit 200. Said predetermined function K may be stored in a memory of said first control unit 200. According to an example a look-up table stored in a memory of said first control unit 200 may be used as an alternative to said predetermined function K. This is further depicted with reference to FIG. 3*a*.

After the method step s460 a subsequent method step s470 is performed.

The method step s470 comprises the step determining an expected accumulated soot emission PM from said exhaust gas down stream of said particulate filter 265 on the basis of said equivalent hole size HAR of said particulate filter 265 from a predetermined function L regarding a relation between said accumulated soot emission PM and said equivalent hole size HAR. This is performed by means of said first control unit 200. This is further depicted with reference to FIG. 3*b*.

Said predetermined function L may be stored in a memory of said first control unit 200. According to an example a look-up table stored in a memory of said first control unit 200 may be used as an alternative to said predetermined function L.

After the method step s470 the method ends/is returned.

Figure 5:
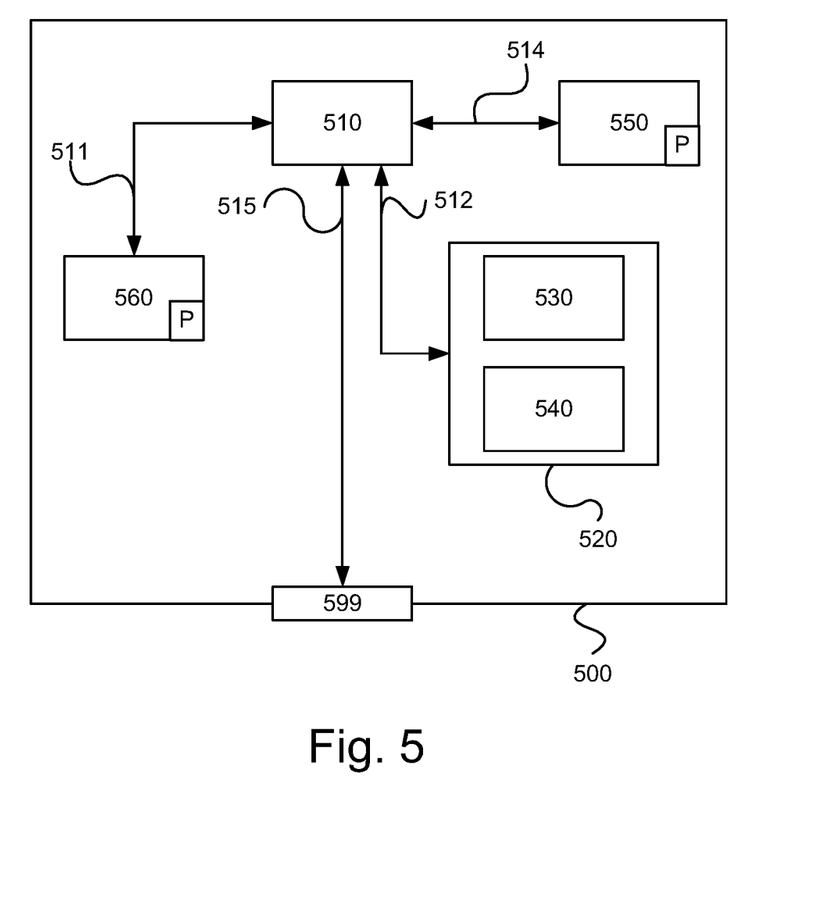
FIG. 5 schematically illustrates a computer according to an embodiment of the invention.

FIG. 5 is a diagram of one version of a device 500. The control units 200 and 210 described with reference to FIG. 2 may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

The computer program P comprises routines for determining a performance of a particulate filter of an engine.

The computer program P may comprise routines for determining at least one exhaust gas temperature upstream of said particulate filter 265.

The computer program P may comprise routines for determining an exhaust gas temperature T3meas downstream of said particulate filter 265.

The computer program P may comprise routines for determining an exhaust gas mass flow ṁ upstream of said particulate filter 265.

The computer program P may comprise routines for determining a modelled temperature T3mod downstream of said particulate filter 265 on the basis of said at least one exhaust gas temperature upstream of said particulate filter 265 and said exhaust gas mass flow ṁ upstream of said particulate filter 265.

The computer program P may comprise routines for determining a residual value R on the basis of said exhaust gas temperature T3meas downstream of said particulate filter 265 and said modelled temperature T3mod.

The computer program P may comprise routines for determining an equivalent hole size HAR of said particulate filter 265 from a predetermined function K regarding a relation between said residual value R and equivalent hole size HAR as a basis for considering said performance of said particulate filter 265.

The computer program P may comprise routines for further determining a temperature difference Δt2 over said particulate filter 265 regarding said exhaust gas temperature. The computer program P may comprise routines for determining said residual value R on the basis of said exhaust gas temperature T3meas downstream of said particulate filter 265 and said modelled temperature T3mod as well as said temperature difference Δt2.

The computer program P may comprise routines for determining a suspected defect of said particulate filter 265 on the basis of said equivalent hole size HAR.

The computer program P may comprise routines for determining an expected accumulated soot emission PM from said exhaust gas down stream of said particulate filter 265 on the basis of said equivalent hole size HAR of said particulate filter 265 from a predetermined function L regarding a relation between said accumulated soot emission and said equivalent hole size HAR.

The program P may be stored in an executable form or in compressed form in a memory 560 and/or in a read/write memory 550.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L210, L230, L221, L222, L223 and L241, for example, may be connected to the data port 599 (see FIG. 2).

When data are received on the data port 599, they are stored temporarily in the second memory element 540. When input data received have been temporarily stored, the data processing unit 510 will be prepared to conduct code execution as described above.

Parts of the methods herein described may be conducted by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The invention claimed is:

1. A method for determining a performance of a particulate filter of an engine based on a determined equivalent hole size of the particulate filter, said method comprising:

determining at least one exhaust gas temperature upstream of said particulate filter, using a first temperature sensor;

determining an exhaust gas temperature downstream of said particulate filter, using a second temperature sensor;

determining an exhaust gas mass flow upstream of said particulate filter;

determining a modelled temperature on the basis of said at least one exhaust gas temperature upstream of said particulate filter and said exhaust gas mass flow upstream of said particulate filter;

determining a residual value on the basis of said exhaust gas temperature downstream of said particulate filter and said modelled temperature; and determining the equivalent hole size of said particulate filter, wherein the equivalent hole size is determined using a predetermined function that defines a relationship between said residual value and an equivalent hole size, and wherein the determined equivalent hole size indicates said performance of said particulate filter.

2. The method according to claim 1, comprising:

further determining a temperature difference over said particulate filter regarding said exhaust gas temperature; and determining said residual value on the basis of said exhaust gas temperature downstream of said particulate filter and said modelled temperature as well as said temperature difference.

3. The method according to claim 1, comprising:

determining a suspected defect of said particulate filter on the basis of said equivalent hole size.

4. The method according to claim 1, comprising:

determining an expected accumulated soot emission from said exhaust gas downstream of said particulate filter, wherein the expected accumulated soot emission is determined based on the determined equivalent hole size of said particulate filter.

5. A system for determining a performance of a particulate filter of an engine based on a determined equivalent hole size of the particulate filter, said system comprising:

means for determining at least one exhaust gas temperature upstream of said particulate filter, using a first temperature sensor;

means for determining an exhaust gas temperature downstream of said particulate filter, using a second temperature sensor;

means for determining an exhaust gas mass flow upstream of said particulate filter;

means for determining a modelled temperature on the basis of said at least one exhaust gas temperature upstream of said particulate filter and said exhaust gas mass flow upstream of said particulate filter;

means for determining a residual value on the basis of said exhaust gas temperature downstream of said particulate filter and said modelled temperature; and means for determining the equivalent hole size of said particulate filter, wherein the equivalent hole size is determined using from a predetermined function that defines a relationship between said residual value and an equivalent hole size, and wherein the determined equivalent hole size indicates said performance of said particulate filter.

6. The system according to claim 5, comprising:

means for determining a temperature difference over said particulate filter regarding said exhaust gas temperature; and means for determining said residual value on the basis of said exhaust gas temperature downstream of said particulate filter and said modelled temperature as well as said temperature difference.

7. The system according to claim 5, comprising:
means for determining a suspected defect of said particulate filter on the basis of said equivalent hole size.

8. The system according to claim 5, comprising:
means for determining an expected accumulated soot emission from said exhaust gas downstream of said particulate filter, wherein the expected accumulated soot emission is determined based on the determined equivalent hole size of said particulate filter.

9. A vehicle comprising a system for determining a performance of a particulate filter of an engine based on a determined equivalent hole size of the particulate filter, said system comprising:
means for determining at least one exhaust gas temperature upstream of said particulate filter, using a first temperature sensor;
means for determining an exhaust gas temperature downstream of said particulate filter, using a second temperature sensor;
means for determining an exhaust gas mass flow upstream of said particulate filter;
means for determining a modelled temperature on the basis of said at least one exhaust gas temperature upstream of said particulate filter and said exhaust gas mass flow upstream of said particulate filter;
means for determining a residual value on the basis of said exhaust gas temperature downstream of said particulate filter and said modelled temperature; and
means for determining the equivalent hole size of said particulate filter, wherein the equivalent hole size is determined using a predetermined function that defines a relationship between said residual value and an equivalent hole size, and wherein the determined equivalent hole size indicates said performance of said particulate filter.

10. The vehicle according to claim 9, which vehicle is any from among a truck, bus or passenger car.

11. A computer program product comprising computer program code stored on a non-transitory computer-readable medium, said computer program product for determining a performance of a particulate filter of an engine based on a determined equivalent hole size of the particulate filter, wherein said computer program product comprising computer instructions to cause one or more computer processors to perform the following operations:
determining at least one exhaust gas temperature upstream of said particulate filter, using a first temperature sensor;
determining an exhaust gas temperature downstream of said particulate filter, using a second temperature sensor;
determining an exhaust gas mass flow upstream of said particulate filter;
determining a modelled temperature on the basis of said at least one exhaust gas temperature upstream of said particulate filter and said exhaust gas mass flow upstream of said particulate filter;
determining a residual value on the basis of said exhaust gas temperature downstream of said particulate filter and said modelled temperature; and
determining the equivalent hole size of said particulate filter, wherein the equivalent hole size is determined using a predetermined function that defines a relationship between said residual value and an equivalent hole size, and wherein the determined equivalent hole size indicates said performance of said particulate filter.

* * * * *

UNITED STATES PATENT AND TRADEMARK OFFICE
CERTIFICATE OF CORRECTION

PATENT NO. : 10,781,738 B2
APPLICATION NO. : 15/776751
DATED : September 22, 2020
INVENTOR(S) : Björn Bökelund et al.

Page 1 of 1

It is certified that error appears in the above-identified patent and that said Letters Patent is hereby corrected as shown below:

In the Claims

In Column 14, Claim 5, Line 59:
Please delete the word "from"

Signed and Sealed this
Fifteenth Day of December, 2020

Andrei Iancu
*Director of the United States Patent and Trademark Office*